F. GOTTSCHALK.
RESISTANCE CELL FOR TRANSMITTERS.
APPLICATION FILED FEB. 13, 1914.

1,137,479. Patented Apr. 27, 1915.

Witnesses
T. L. Mockbee
W. N. Roach, Jr.

Inventor
Felix Gottschalk,
By N. H. Van Deventer
Attorney

UNITED STATES PATENT OFFICE.

FELIX GOTTSCHALK, OF STIRLING, NEW JERSEY.

RESISTANCE-CELL FOR TRANSMITTERS.

1,137,479.

Specification of Letters Patent. Patented Apr. 27, 1915.

Application filed February 13, 1914. Serial No. 818,502.

*To all whom it may concern:*

Be it known that I, FELIX GOTTSCHALK, a citizen of the United States, residing at Stirling, in the county of Morris and State of New Jersey, have invented certain new and useful Improvements in Resistance-Cells for Transmitters, of which the following is a specification, reference being had to the accompanying drawing.

My invention relates to resistance cells for use in telephone transmitters and electrical instruments for detecting mechanical vibrations, such as the device described in my pending application 812,266.

The objects are to produce a resistance cell having a diaphragm with a large area free to vibrate, permitting of a greater current variation without enlarging the electrodes or carbon chamber.

Another object, is to prevent any excessive outward movement of the diaphragm of the carbon cell, where a main diaphragm with a free vibrating periphery, is employed.

A further object is to prevent outward stress of the mica diaphragm such as commonly occurs when the resistance cell is overheated.

Another object is to prevent the lodgment of dust or particles of the granular resistance medium between the back casing and the diaphragm should same escape from the cell.

There are other advantages as hereinafter described.

Figure 1:
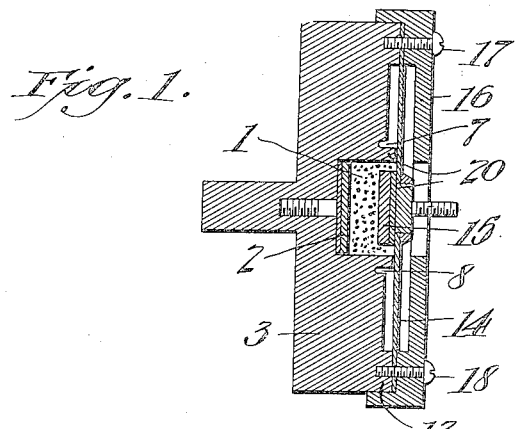
Figure 2:
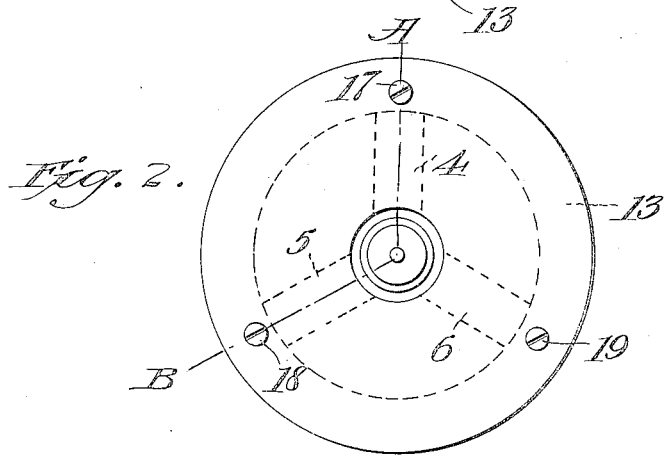
Figure 3:
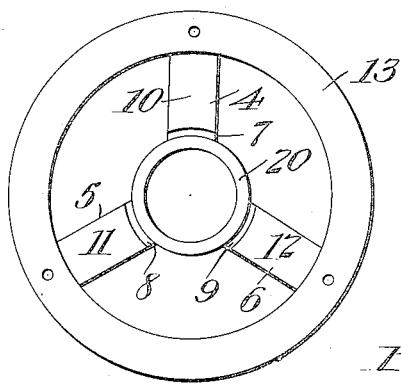

In the accompanying drawings, Figure 1 is a sectional view on the line A B, Fig. 2 of a cell embodying my invention. Fig. 2, a front view of the cell, and Fig. 3, a view of the rear casing with the diaphragm and front electrode removed.

Like figures of reference denote the same parts wherever they are shown.

1 is a chamber for the variable resistance medium such as carbon granules. At the bottom of this chamber is positioned the electrode 2 which is attached to the casing 3 having a suitable number of radial arms 4, 5 and 6, united by the annular band 13. These arms are deeply grooved at 7, 8 and 9 and the surfaces 10, 11 and 12, are slightly below the surface of annular ring 13. Supported by ring 13 is placed the diaphragm 14 carrying the front electrode 15 and clamping this diaphragm in place is the metal plate 16 which is attached to the casing 3 by means of screws 17, 18 and 19 or in any other suitable manner.

It will be obvious from a study of the figures that the diameter of the diaphragm may be much greater than that of the electrodes, and yet owing to the annular flange 20 none of the resistance medium will escape, and any fine carbon dust or powder will be caught in the grooves 7, 8 and 9 and not lodge between the surface of the arms and the diaphragm. Flange 20 just clears the diaphragm—does not actually touch it, and is measurably lower than the upper surface of 13. And while I have shown radial arms it is obvious that a solid plate like member may be employed. For very slight vibrations, the side next the diaphragm may be flat. But usually it is cut away except the portion 13 supporting the diaphragm and the flange 20.

Heretofore in cells where the diaphragm is not firmly clamped at the wall of the electrode chamber, it has been necessary to use cotton batting or some other packing which my construction renders unnecessary. The cover plate 16 may be slightly countersunk on its inner face except for an annular surface at its extreme edge, corresponding to 13, so that limited vibrations of the diaphragm outwardly are possible, and yet extreme vibrations outwardly are limited, as the diaphragm would strike the inner surface of the metal ring.

I find that radial arms projecting from the body of the cell proper, aid in dissipating the heat generated in the cell, and distortion of the diaphragm and consequent change in the electrical variations produced is prevented. And while a solid member may be employed, forming both cell and diaphragm support, the construction shown is preferred.

It is obvious that a cell of my improved construction may be employed in any apparatus where such cells are used, and as such arrangements are well known, I do not describe same.

I claim—

1. A resistance cell comprising a member adapted to be secured to a transmitter bridge, and forming a chamber carrying electrodes and a variable resistance medium, a diaphragm of insulating material supporting one of said electrodes and having a diameter greater than the cell chamber and forming a closure therefor, means on said last mentioned electrode whereby it may be secured to a sound receiving diaphragm, a support carried by said member for the periphery of said diaphragm of insulating material and means for clamping said diaphragm to said support.

2. A resistance cell adapted to be mounted in a transmitter casing comprising a member forming a chamber, an electrode and a variable resistance medium in said chamber, a front electrode partially closing said chamber, a diaphragm supporting said front electrode, radial arms projecting from the chamber and united at their outer ends to form a diaphragm support, means for securing said diaphragm to said support, and cut-away portions in the surface of said arms adjacent the diaphragm, substantially as described.

3. A resistance cell comprising a member forming a chamber having relatively thin lateral walls and adapted to be secured to a transmitter bridge, electrodes and a variable resistance medium in said chamber, radially projecting arms adapted to radiate heat from said chamber and support an annular ring, a diaphragm of insulating material supported by said ring, means supported by said diaphragm whereby it may be secured to a sound receiving diaphragm, and a plate covering substantially all of said first mentioned diaphragm except over the electrode chamber, substantially as described.

4. A resistance cell comprising an electrode chamber adapted to be secured to a transmitter bridge, a pair of electrodes, a resistance medium between the electrodes, a plurality of radial arms projecting from said chamber and carrying a diaphragm of insulating material closing said chamber and supported only at its peripheral portion by said support, a plate covering all of the said diaphragm laterally outside said chamber, and means for connecting said diaphragm to a sound receiving diaphragm, substantially as described.

5. In a resistance cell, an electrode chamber adapted to be secured to a transmitter bridge, a diaphragm of insulating material of greater diameter than the outer wall of said chamber, means carried by said chamber for securing said diaphragm at its periphery so it is free to vibrate, means carried by said chamber inclosing all of said diaphragm except the portion above said chamber and means carried by said diaphragm whereby it may be connected to a sound receiving diaphragm.

6. In a resistance cell, an electrode chamber adapted to be secured to a transmitter bridge, a diaphragm of insulating material of greater diameter than the outer wall of said chamber, means supporting the periphery of said diaphragm carried by said cell said means comprising a plurality of radial arms projected from said cell the outer ends of said arms being united by an annular band and means on said diaphragm for connecting it to the usual main sound receiving diaphragm of a transmitter, substantially as described.

In testimony whereof I hereunto affix my signature in the presence of two witnesses.

FELIX GOTTSCHALK.

Witnesses:
 WM. H. LUBRECHT,
 ROBERT P. CONKLING.